United States Patent [19]

Moussa et al.

[11] Patent Number: 5,387,915
[45] Date of Patent: Feb. 7, 1995

[54] METHOD AND APPARATUS FOR DETECTING AND DECODING TRANSPONDER REPLY SIGNALS

[75] Inventors: Joseph Moussa, Hilliard; William E. Schleder, Dublin; Richard Thwaits, Columbus, all of Ohio

[73] Assignee: B. F. Goodrich FlightSystems, Inc., Columbus, Ohio

[21] Appl. No.: 153,723

[22] Filed: Nov. 16, 1993

[51] Int. Cl.6 .................................................. G01S 13/80
[52] U.S. Cl. ........................................ 342/40; 342/46; 342/32; 342/37
[58] Field of Search ......................... 342/40, 32, 37, 46

[56] References Cited

U.S. PATENT DOCUMENTS

| | | | |
|---|---|---|---|
| 3,705,402 | 12/1972 | Ballantyne et al. | 342/40 |
| 4,010,465 | 3/1977 | Dodington et al. | 342/35 |
| 4,161,729 | 7/1979 | Schneider | 342/32 |
| 4,642,638 | 2/1987 | Callahan, Jr. | 342/45 |
| 4,896,158 | 1/1990 | Cole, Jr. | 342/40 |
| 4,899,157 | 2/1990 | Sanford et al. | 342/40 |
| 4,945,550 | 7/1990 | Krause et al. | 375/94 |
| 5,142,287 | 8/1992 | LaBerge et al. | 342/35 |
| 5,220,329 | 6/1993 | Verbeke, Jr. et al. | 342/40 |

*Primary Examiner*—John B. Sotomayor
*Attorney, Agent, or Firm*—Leonard L. Lewis; William E. Zitelli

[57] ABSTRACT

Methods and apparatus for detecting and decoding transponder reply signals of the type having a plurality of associated time discrete pulses including two bracket pulses and a number of related data pulses that may have been transmitted at discrete data time intervals between the bracket pulses such that the signal content detected during the data time intervals corresponds to the reply signal data code, comprising receiver means for receiving the reply signals and producing in-phase (I), quadrature (Q) phase and video (V) signals for each received pulse; means for detecting received pulses and storing the I/Q/V signals in a first memory; means for storing in a second memory pointer values that correspond to the temporal location of pulse I/Q/V signals in the first memory; means for identifying, based on time of arrival (TOA) values, pairs of potential bracket pulses wherein each pair marks the beginning and end of a reply code; and processor means for 1) determining an angle of arrival (AOA) value for each detected pulse based on each pulse's I and Q signals, 2) selecting a reference pulse for each potential bracket pair based on relative amplitudes of the bracket pair, and 3) identifying data pulses, associated with the reply signal and detected between occurrence of the bracket pulses, based on the reference pulse to provide the reply code. Such apparatus also provides for a determination of confidence factors relating to each detected pulse and each data value assigned to a data time interval of the reply code. Such apparatus further provides for pulse sharing, pulse claiming, reply code modification and false reply identification and deletion.

52 Claims, 6 Drawing Sheets

X— REJECT BRACKET PAIR
100— COMPUTE POTENTIAL F2 FIFO POSITION
102— CHECK IF F2 IS OUT OF CIRCULATION
104— POINT TO THE F2 PULSE
106— CHECK IF 1ST REPLY IN ANTENNA
108— CHECK IF F2 FIFO AND RAM POSTIONS ARE VALID
110— COMPUTE F1 SEARCH PARAMETERS FOR FIRST REPLY
112— CHECK IF F2 WAS DETECTED VERY CLOSE TO A PREVIOUS REPLY F2
114— CHECK IF PHANTOM SPI REPLY
116— COMPUTE F1 SEARCH PARAMETERS FOR nth REPLY (n71)
118— CHECK IF TOP ANTENNA DATA
120— COMPUTE WHETHER F2 IQ IS CLEAN
122— START SEARCH FOR F1; START FROM F2
124— CHECK IF PREVIOUS PULSE TIME IS VALID
126— CHECK FOR MORE POSSIBILITIES
128— SAVE POTENTIAL F1 FIFO POSITION
130— CHECK IF F1 IS OUT OF CIRCULATION
132— CHECK IF TOP ANTENNA DATA
134— COMPUTE WHETHER F1 IQ IS CLEAN
136— CHECK IF F1&F2 ARE BOTH IQ GARBLED
138— CHECK IF F1 IS IQ GARBLED
140— CHECK IF F1 AMPLITUDE <= F2 AMPLITUDE
142— CHECK IF F2 AMP — F1 AMP > AMP RELATIVE TO REFERENCE
144— F1 FOUND; STOP SEARCHING; EXIT THE LOOP
146— CHECK IF F2 IS IQ GARBLED
148— CHECK IF F2 AMPLITUDE <= F1 AMPLITUDE
150— CHECK IF F1 AMP — F2 AMP > AMP RELATIVE TO REFERENCE
152— CHECK IF F1 AMPLITUDE < F2 AMPLITUDE
154— CHECK IF F2 AMP — F1 AMP > AMP RELATIVE REF (CLEAN)
156— CHECK IF F1 AMP — F2 AMP > AMP RELATIVE REF (CLEAN)
158— CHECK WHETHER F1 WAS FOUND
160— CHECK IF nth REPLY (n>1) AND F1 IN VERY CLOSE PROXIMITY TO A PREVIOUS REPLY F1
162— SAVE F1 AND F2 RAM (time) POSITIONS IN THE REPLY
164— CHECK IF TOP ANTENNA DATA
166— COMPUTE F1 AND F2 AOAs; ASSIGN TOP ANTENNA FLAGS
168— CHECK IF F1 AND F2 HAVE CLEAN IQs
170— CHECK IF F1 AMPLITUDE <= F2 AMPLITUDE
172— CHECK IF F2 (AOA AND AMP) IS HIGHLY COMPARABLE RELATIVE TO F1(REFERENCE); REASSIGN CLEANNESS ACCORDINGLY
174— CHECK IF F1 (AOA AND AMP) IS HIGHLY COMPARABLE RELATIVE TO F2 (REFERENCE); REASSIGN "CLEANNESS" ACCORDINGLY
176— CHECK WHETHER F1 AND F2 ARE STILL CLEAN
178— ASSIGN ACCURATE AOA FLAG; AVERAGE AMP AND AOA OF F1 AND F2
180— ASSIGN INACCURATE AOA FLAG
182— CHECK IF F1 IS CLEAN
184— ESTABLISH F1 AS REFERENCE
186— ESTABLISH F2 AS REFERENCE
188— IF F1 PULSE IS CLEAN, TAKE OUT OF CIRCULATION, AND REMOVE FROM PRIOR USAGE IN OTHER REPLIES. IF GARBLED, KEEP IN CIRCULATION AND UPDATE LISTS. DO SAME FOR F2. DONE DECODING THIS F1-F2 PAIR.
190— ASSIGN BOTTOM ANTENNA FLAGS
192— CHECK IF F1 AMPLITUDE <= F2 AMPLITUDE
194— ESTABLISH F1 AS A REFERENCE
196— ESTABLISH F2 AS A REFERENCE
198— AVERAGE F1 AND F2 AMPLITUDE AND SET AOA TO 0

Fig.4B

200— INITIALIZE REPLY AND GARBLE CODES.
202— CHECK FOR THE EXISTENCE OF ANY FLAGGED PULSES BETWEEN F1 AND F2.
204— COMPUTE F1 MINIMUM AND MAXIMUM POSITIONS. INITIALIZE PARAMETERS FOR DATA PULSE SEARCHING.
206— START THE SEARCH FOR DATA PULSES FROM C1 TO D4.
208— UPDATE A BIT TO REPRESENT THE DATA PULSE CURRENTLY SEARCHING FOR.
210— COMPUTE DATA PULSE TO F1 INTERVAL.
212— INITIALIZE GARBLE MATCHES. INITIALIZE PARAMETERS REQUIRED FOR SEARCHING FOR CURRENT PULSE.
214— CHECK IF THE NEXT PULSE RAM POSITION IS BEFORE THAT OF THE EXPECTED PULSE.
216— CHECK IF THE NEXT PULSE RAM POSITION IS BEYOND THAT OF THE EXPECTED PULSE.
220— CHECK IF THE PULSE IS OUT OF CIRCULATION.
222— CHECK IF THE REPLY (REFERENCE DATA) AMPLITUDE>PULSE AMPLITUDE.
224— CHECK IF THE AMPLITUDE DIFFERENCE>AMPLITUDE RELATIVE TO REFERENCE.
226— COMPUTE AMPLITUDE DIFFERENCE.
228— CHECK IF THE AMPLITUDE DIFFERENCE $\leq$ AMPLITUDE RELATIVE TO REFERENCE (CLEAN).
230— CHECK IF TOP ANTENNA DATA.
232— CHECK IF THE REPLY (REFERENCE) AOA IS COMPARABLE TO THE PULSE AOA. ADJUST CLEAN FLAG ACCORDINGLY.
234— ASSIGN CLEAN FLAG.
236— ASSIGN GARBLE FLAG.
238— PULSE FOUND. SAVE PULSE FIFO POSITION.
240— CHECK IF DATA PULSE IS CLEAN.
242— CHECK IF NUMBER OF GARBLE PULSE MATCHES = 2.
244— CHECK FOR PULSE WITH BEST TIME MATCH.
246— UPDATE PULSE FIFO POSITION TO REFLECT THAT OF BEST MATCH.
218— DONE SEARCHING FOR THIS PULSE.
248— CHECK IF PULSE WAS FOUND.
250— IF PULSE IS CLEAN, TAKE IT OUT OF CIRCULATION, AND UPDATE ITS PRIOR USAGE IN THE REPLY LISTS. IF GARBLED, UPDATE ITS USAGE TO REFLECT THE MOST CURRENT USERS.
252— MAP THE REPLY PULSE TO ITS EQUIVALENT CODE BIT, AND UPDATE THE REPLY CODE.
254— CHECK IF PULSE WAS NOT CLEAN.
256— MAP THE REPLY PULSE TO ITS EQUIVALENT CODE BIT, AND UPDATE THE REPLY GARBLE CODE.
258— CHECK IF MORE PULSES WERE FLAGGED BETWEEN THE CURRENT ONE AND F2.
260— UPDATE THE REPLY AND GARBLE CODES. DONE PROCESSING THIS REPLY.

Fig.5B

METHOD AND APPARATUS FOR DETECTING AND DECODING TRANSPONDER REPLY SIGNALS

BACKGROUND OF THE INVENTION

This patent application is related to co-pending U.S. patent application. Ser. No. 08/153,724, filed on even date herewith, entitled "METHOD AND APPARATUS FOR MULTIPLE REPLY REJECTION WHEN DECODING TRANSPONDER REPLY SIGNALS"; and Ser. No. 08/153,722, also filed on even date herewith, entitled "METHOD AND APPARATUS FOR ASSOCIATING TARGET REPLIES WITH TARGET SIGNATURES"; both co-pending applications being commonly owned by the assignee of the present invention, the entire disclosures of which are fully incorporated herein by reference.

The invention relates generally to detecting and decoding reply signals transmitted from aircraft transponders. More specifically, the invention relates to such detecting and decoding under conditions in which multiple reply signals are received during a receive interval following an interrogation.

Air traffic control and safety are ongoing concerns in commercial and military aviation. Particularly significant concerns are traffic alert and collision avoidance between aircraft either in route between or in the vicinity of landing fields. Ever increasing air traffic demands have resulted in governmental regulations that require commercial carriers to equip planes with active interrogation systems that can determine the presence and threat of nearby aircraft. The particular system mandated by the government depends on the aircraft size. Large commercial aircraft that carry over 30 passengers are being equipped with an active traffic alert and collision avoidance system (TCAS II) that not only detects and displays nearby aircraft, but also alerts the crew as to impending collisions, and also provides resolution advisories such as audible instructions to the pilot to pull up or down, maintain level or climb rate and so forth. This system, however, is very complex and expensive and therefore has not been mandated for smaller aircraft.

For aircraft that carry up to 30 passengers, governmental regulations require such aircraft be equipped with an active traffic alert and collision avoidance system (TCAS I) that detects nearby aircraft, determines and displays range, bearing and altitude of such aircraft relative to the interrogating plane, and tracks such aircraft within a prescribed range and issues an audible alert to the crew as to impending collisions. Although the operational performance of the TCAS I system appears less complex than TCAS II, numerous problems arise that make a cost effective system difficult to realize.

The Federal Aviation Administration (FAA) specifies that the TCAS I active interrogation systems use air traffic control radar beacon system (ATCRBS) signals. These ATCRBS interrogation signals are high frequency pulse amplitude modulated signals at 1030 Megahertz. The reply signals are also pulse amplitude modulated but at a carrier frequency of 1090 Megahertz. In TCAS I, the interrogation signals are transmitted from an interrogating aircraft to other aircraft in the vicinity thereof, and these other aircraft respond to the interrogations via a transponder located on the aircraft.

The interrogation and reply signal waveforms are specified by the FAA. The information contained in the reply signal depends on the type of interrogation (e.g. Mode A, Mode C) and the transponder equipment that the interrogated aircraft has available for responding. For TCAS I, the interrogation mode is Mode C, and the Mode C reply signal from the aircraft transponder consists primarily of encoded altitude data. The altitude data is encoded using binary logic states or bits arranged in four digit octal codes (i.e. each octal altitude code has twelve data bits with each octal digit defined by three data bits). The reply signal data bits are transmitted within a pair of framing pulses called bracket pulses that indicate (for purposes of TCAS I) the beginning and end of an altitude code reply signal from a particular aircraft responding to an interrogation.

A TCAS I system is specified based on the use of these ATCRBS Mode C reply signal waveforms. Thus, an interrogating aircraft may transmit an interrogation signal at 1030 MHz, and then will "listen" for Mode C reply signals from all aircraft capable of responding by transmitting the bracket pulses and altitude encoded data pulses. Some aircraft are not equipped to reply with altitude data (non-altitude reporting, or NAR) and hence only transmit the bracket pulses. Under TCAS I, aircraft within a range of about 34 nautical miles will reply to a Mode C interrogation.

When only a few aircrafts are within range for responding to a TCAS I interrogation, reply signal decoding is uncomplicated by the relative lack of interfering or overlapping replies. However, as the number of planes replying to an interrogation increases, reply signals received by an interrogating aircraft can overlap in time and thus produce what is referred to as synchronous garble. Synchronous garble basically refers to the presence of legitimate reply signals from different aircraft that are properly responding to the same interrogation such that their reply signals are overlapped in time when received by the interrogating plane. A TCAS compatible system must be able to separate the overlapping replies to a specified degree of accuracy by correctly associating received pulses to their respective reply signal.

Another problem in high density traffic areas arises from the presence of multiple ground based radars in the FAA secondary surveillance radar (SSR) system that can also be transmitting interrogations to aircraft, such as with Mode C and Mode A interrogations. Mode A and C replies to such SSR interrogations may be detected by any aircraft listening for Mode C replies, even though these replies are not in response to an aircraft interrogation. Also, multiple aircraft can be sending out Mode C interrogations. Aircrafts listening for replies will detect (if within range) the reply signals from nearby aircraft responding to these interrogations. Both these types of replies are asynchronous garble with respect to an interrogating aircraft, and are generally referred to as fruit replies. The fruit replies can overlap legitimate reply signals in a manner similar to the synchronous garble and must also be filtered.

Such garbled and overlapping reply signals make detection and decoding of the legitimate reply signals very difficult, particularly in areas with high density of transponder equipped aircraft where the TCAS systems are most needed. This is because prior systems typically were hardware intensive for detecting and decoding reply signals. Furthermore, even when reply signals could be detected by such systems, the presence of garbled signals could produce inaccurate decoded information.

The objective exists, therefore, for a traffic alert and collision avoidance system that utilizes and implements a reply signal decoding technique that can successfully discriminate overlapping reply signals and accurately decode garbled signals. Such a system also should be capable of identifying garbled information.

SUMMARY OF THE INVENTION

In view of the aforementioned objectives, the invention contemplates, in one embodiment, apparatus for detecting and decoding reply signals of the type having a plurality of associated time discrete pulses including two bracket pulses and a number of related data pulses that may have been transmitted at discrete data time intervals between the bracket pulses such that the signal content detected during the data time intervals corresponds to the reply signal data code, comprising receiver means for receiving the reply signals and producing in-phase (I), quadrature (Q) phase and video (V) signals for each received pulse; means for detecting received pulses and storing said I/Q/V signals in a first memory; means for storing in a second memory pointer values that correspond to the temporal location of pulse I/Q/V signals in said first memory; means for identifying, based on time of arrival (TOA) values, pairs of potential bracket pulses wherein each pair marks the beginning and end of a reply code; and processor means for 1) determining an angle of arrival (AOA) value for each detected pulse based on each pulse's I and Q signals, 2) selecting a reference pulse for each said potential bracket pair based on relative amplitudes of said bracket pair, and 3) identifying data pulses, associated with said reply signal and detected between occurrence of said bracket pulses, based on said reference pulse to provide the reply code.

The invention also contemplates the methods embodied in the use of such apparatus, as well as a method for detecting and identifying a transponder reply signal of the type having a plurality of associated time discrete pulses including two bracket pulses and a number of related data pulses that may have been transmitted at discrete data time intervals between the bracket pulses such that the signal content detected during the data time intervals corresponds to the reply signal data code, comprising the steps of:

a. producing a video signal for each received pulse;

b. detecting potential bracket and data pulses based on said video signals;

c. pairing bracket pulses that mark the beginning and end of a reply signal code based on time of arrival (TOA) of said detected pulses;

d. identifying a reference pulse from said bracket pulses based on relative amplitude of said bracket pulses; and e. identifying data pulses, associated with said reply signal and detected between occurrence of said bracket pulses, based on said reference pulse to provide the reply code.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
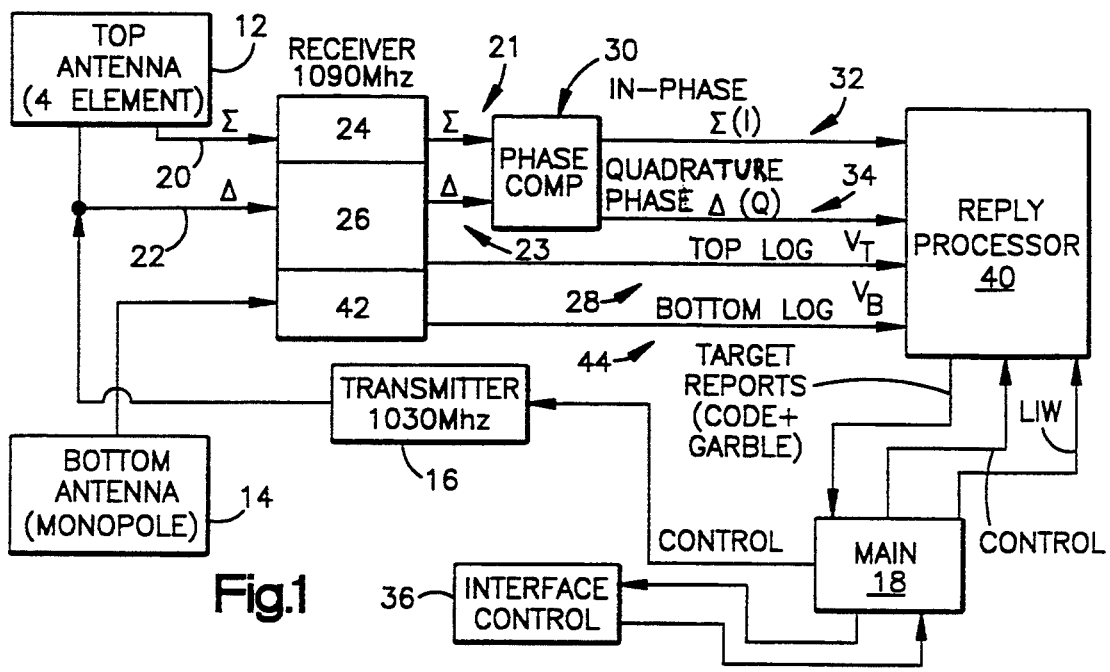
FIG. 1 is system level functional block diagram of a traffic alert and collision avoidance system according to the present invention.

With reference to FIG. 1, an interrogation and reply decoding system for aircraft is shown in system level functional diagram form and generally indicated with the numeral 10. In accordance with an important aspect of the invention, the system 10 incorporates hardware for reply signal detection, and extensively utilizes software for reply signal processing.

Although the invention is described herein with particular reference to an embodiment in an active interrogation system that conforms to the traffic alert and collision avoidance system (TCAS I), such description should not be construed in a limiting sense. Various aspects of the invention relating to reply signal detection and decoding methods and apparatus can be applied in other applications (including, for example, passive systems) wherein it is necessary to detect and decode transmitted signals that have characteristics or problems similar to detecting the ATCRBS reply signals used in a TCAS I environment. For example, the methods and apparatus of the invention as described in this case can be applied to detecting and decoding signals that contain range and/or bearing information for different transmitter and receiver locations of those signals. As another example, the invention could be used for decoding Mode A reply signals. Mode A replies are not used in TCAS I, but have waveforms that are similar. A Mode A reply encodes, for example, the responding aircraft's ID, which is often used by air traffic control.

The system 10 in this case includes a first or top antenna 12 and a second or bottom antenna 14. The top antenna 12 is used both to transmit interrogation signals from an aircraft in an omnidirectional manner, as well as to receive reply signals from nearby aircraft from any bearing location relative to the interrogating aircraft. The bottom antenna 14 is used only as a non-directional receiving antenna for such reply signals. The top antenna is referred to herein as being a directional antenna because it is used to provide bearing information for aircraft responding to an interrogation (called a target hereinafter). The bottom antenna is referred to herein as a non-directional antenna because it is not used to provide bearing information. As will be explained further herein, reply signals can be received by either or both antennas. The top antenna may be part no. S72-1749 available from Sensor Systems, Inc., and the bottom antenna can be part no. CI-305 available from Comant Industries, Inc.

In a TCAS I compatible system such as described herein, the system 10 is installed on an aircraft such as a regional airliner or a commuter aircraft that is used to carry thirty passengers or less. The basic function of the system 10 is to transmit interrogation signals via the top antenna 12 omnidirectionally from the interrogating aircraft. Aircraft that are equipped in a conventional manner with a transponder and are in the vicinity of the interrogating aircraft will detect the interrogation signals and in turn issue a reply signal that is transmitted omnidirectionally from each responding aircraft.

As previously described herein, the TCAS I Mode C reply signal is a pulse amplitude modulated encoded signal having a waveform specified by the FAA. Aircraft that are equipped to respond with altitude information will emit a reply signal that includes twelve data bits that represent four digits of an octal Gray code of the responding aircraft's altitude. The twelve data bits collectively form a reply code for the reply signal; and each bit is encoded in the form of a binary signal pattern within a specified data time interval or period. In the case of a TCAS I reply signal, a binary "1" value is encoded as a transmitted pulse of specified amplitude and duration; while a binary "0" value is encoded as the absence of such a pulse within a data time interval. The terms "data value" and "data bit" are used interchangeably herein to refer to the data information assigned to each data time interval based on the signal content determined for that interval.

Thus, a TCAS I reply signal is detected and decoded primarily by identifying which received pulses belong to or are associated with a specific reply. Once the received pulses have been correctly associated with their respective reply signals, then the corresponding reply code is derived by assigning a "1" to each data time interval if a pulse was present, and assigning a "0" to a data time interval if a pulse was not present. Thus, the reply code is developed by determining the signal content (pulse/no pulse) within each data time interval. But it is the association of the transmitted pulses with their correct reply codes that is the basis for this signal content determination.

For purposes of explaining the invention then, reference is made herein to the process of detecting and decoding reply signals, which primarily refers to the process of detecting and associating received pulses that belong to a specific reply signal. Furthermore, reference herein to decoding pulses or pulse decoding refers to the process of ascertaining each received pulse's characteristic information such as amplitude, time of arrival, and angle of arrival (for top antenna signals), and based on this information deciding to which reply signal each pulse belongs.

As will be explained in greater detail herein, a TCAS I Mode C reply signal includes a pair of pulses that bracket the altitude reply code, and a number (0 up to 12) of pulses transmitted within the bracket pulses that represent the altitude code bits based on the signal content within each data time interval. For clarity and ease of explanation, the pulses transmitted between the bracket pulses will be referred to herein as data pulses, it being understood that for TCAS I it is the presence or absence of such pulses during the data time intervals that in fact makes up each encoded data bit.

In general then, the system 10 is configured to receive and detect the reply signals transmitted from responding aircraft and to decode the reply signals in order to determine range, bearing and relative altitude of the responding aircraft with respect to the interrogating aircraft.

As shown in FIG. 1 then, the system 10 further includes a transmitter section 16 which in this case produces a 1030 MHz amplitude modulated drive signal that is coupled to the top antenna 12. The system 10 is configured to use 1030 MHz interrogation signals similar to those used in the secondary surveillance radar portion of the ground based air traffic control system. The system 10 interrogation rate, however, is typically much slower than the interrogation rate of the SSR system, and typically is on the order of an interrogation every one or two seconds.

The 1030 MHz interrogation signal is transmitted from the top antenna 12. A main processor 18 is programmed so as to control, through appropriate timing logic, when the transmission cycles begin and end for the 1030 MHz transmitter 16.

The top antenna 12 also functions as an omnidirectional receiving antenna for providing bearing information. In this case the antenna is preferably a four element or monopole array formed in the shape of a square (not shown). The output of each of these four elements can be combined, summed and subtracted in a conventional manner so as to produce a sum channel 20 and delta channel 22. As is known to those skilled in the art, these sum and delta channel signals have a relative phase relationship with respect to each other that is an indication of the bearing of the aircraft that transmitted the reply signal. The sum and delta channel signals 20,22 are input to respective sum and delta channel receiver sections 24,26. In the described embodiment, the received signals are characterized by a modulated high frequency carrier signal of 1090 MHz and the receiver sections 24,26 are used in a conventional manner to convert the sum and delta channel signals to a lower intermediate frequency (IF) which in this case is about 60 MHz.

The delta channel receiver 26 is also used to produce a log video signal 28 for the top antenna. As is well known to those skilled in the art, the log video signal 28 is an amplitude versus time signal that allows for a determination of the time of arrival of the various pulses that can be received as part of each reply signal. The range of a responding aircraft thus can be derived from the reply signal time of arrival (TOA) relative to a reference time that is a function of the time of transmission of an interrogation, because the reply signals travel at the speed of light. The general shape of the log video signal is a series of one or more pulses wherein the amplitude of the received pulses will be a function of the strength of the signal as received.

The IF sum and delta channel signals 21,23 are input to a phase comparator 30. The phase comparator 30 may be conventional in design as is well-known to those skilled in the art and produces two output signals that are generally referred to as the in-phase and quadrature signals 32,34. Hereinafter the in-phase signal 32 will be represented by a capital letter I and the quadrature phase signal 34 will be represented by the capital letter Q. As is known, the I and Q signals basically represent the sine and cosine components of the relative phase angle (that corresponds to reply signal bearing) between the sum and delta channel signals. Thus, a calculation of the arc-tangent function of the I and Q signals can be performed to compute the phase angle or bearing of the corresponding received signal. In actual practice, a look-up table can be used to provide the phase angle information based on the I and Q values so that the arc-tangent computation can be obviated to unburden the real-time processing calculations.

Use of a second look-up table (in the main processor 18 that correlates the phase angle to bearing or AOA) in conjunction with a preferred calibration method and apparatus is described in co-pending U.S. patent application Ser. No. 08/153,737 for "CALIBRATION METHOD AND APPARATUS FOR RECEIVING TRANSPONDER REPLY SIGNALS", filed on even date herewith, and commonly owned by the assignee of the present invention, the entire disclosure of which is expressly and fully incorporated herein by reference.

The phase angle thus derived from the I and Q signals corresponds to the angle of arrival (AOA) of each of the pulses received as part of a reply signal. It should be noted again that multiple reply signals may be received during a listening period that follows an interrogation transmission by the interrogating aircraft. Each of these reply signals may contain a number of data pulses, and the reply signals and pulses received from different aircraft may overlap in time with each other. The listening period is based on the range from which responding aircraft replies are to be detected, and may be dynamically controlled if desired for a particular application. In the embodiment described herein, a listen in window is opened for 400 $\mu$sec which corresponds to about 34 nautical miles.

Thus, from the directional top antenna 12, I and Q signals as well as a log video signal are produced for each pulse received by the antenna whether the pulses are data related pulses, bracket pulses or any other pulses having waveforms and characteristics similar to reply signal pulses. The I and Q signals 32,34 and the log video signal 28 are input to a reply processor 40.

In the embodiment illustrated in FIG. 1, the system 10 further includes the bottom antenna 14 which in this case is a single monopole antenna that does not provide directional or bearing information such as is provided by the top antenna. The bottom antenna is, with respect to the present invention, primarily used as a second source of time and amplitude information for the received reply signals in the event that the signals received by the top antenna are too garbled to permit clean identification, or are not received at all by the top antenna (which can occur, for example, when a target is directly below the interrogating aircraft). The bottom antenna signals therefore can be used to maintain or "coast" a target using altitude and range information only for a number of interrogations until the directional information from the top antenna can be reacquired.

Signals received by the bottom antenna 14 are coupled to a bottom antenna receiver 42 which converts the bottom antenna signals to a corresponding log video signal 44 at the video frequency. This bottom antenna log video signal 44 is also input to the reply processor 40.

A basic function of the reply processor 40, as will be described in greater detail hereinafter, is to analyze the data available for each received pulse including the I, Q and log video data from the top antenna in order to identify pulses that can be matched together to form a reply signal and corresponding reply code. The reply codes (including those decoded from the top and bottom antennas) are then sent to or accessed by the main processor 18 in the form of an electronic reply code report in order to develop tracking information of responding aircraft called targets. A reply report (also referred to as a target report) includes not only the altitude code, but additional information such as, but not limited to, the time of arrival of the reply signal (range), angle of arrival of the reply signal (bearing) and information relating to the confidence that the data bits are accurate.

After an interrogation signal is transmitted through the top antenna 12 delta channel 22 by the interrogating aircraft, the main processor 18 sends a listen-in-window (LIW) control signal to the reply processor 40. The LIW signal 48 is used to control the time period during which a valid reply signal or signals are permitted to be received and processed. In this case, the listen window is opened up to about 400 $\mu$sec. Thus, any aircraft within about a thirty-four nautical mile radius of the interrogating aircraft that receives the interrogation signal will respond after a brief delay by transmitting omnidirectionally a reply signal of the general waveform shown in FIG. 2. A series of interrogation signals may be used in an interrogation sequence, such as used during a "whisper/shout" interrogation sequence as known to those skilled in the art. In the embodiment described herein, each interrogation of a sequence has a corresponding LIW period during which replies are detected.

Figure 2:
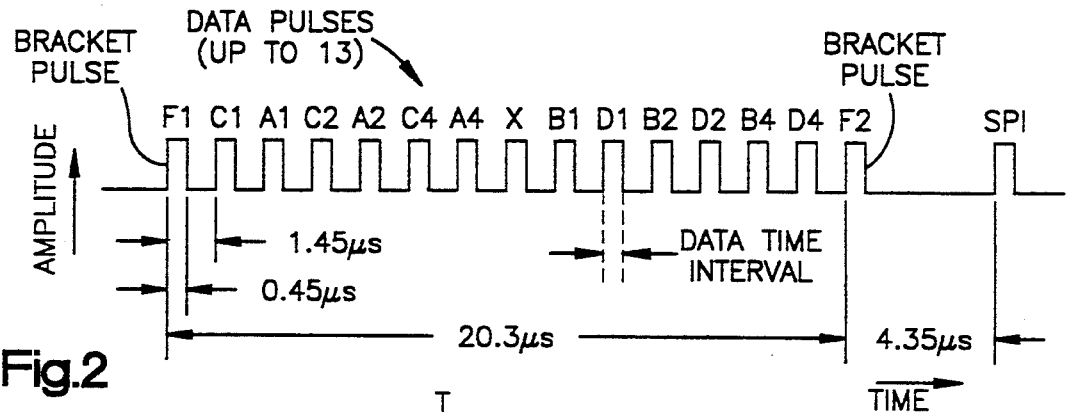
FIG. 2 is a timing diagram of a typical reply signal detected and decoded by the system shown in FIG. 1.

In this case, since the system 10 described herein is a TCAS I compatible system, the interrogation signal is a Mode C interrogation and, therefore, responding aircraft will transmit a Mode C reply signal of the type shown in FIG. 2. The reply signal includes a pair of bracket pulses F1 and F2 which correspond to or mark the beginning and end of the altitude code of a reply signal and are spaced apart by 20.3 $\pm$0.1 $\mu$sec. In actual practice, a Mode C reply signal may also include a pulse that occurs 4.35 microseconds after the F2 end bracket pulse and this pulse is generally known as the Special Pulse Indicator (SPI) pulse. The SPI pulse is used by ground based air traffic control to aid in aircraft identification, but does not encode information presently used in TCAS I. Therefore, a TCAS I compatible system 10 as in this case is configured to ignore the SPI pulse if it is detected.

If the responding aircraft that sends a reply signal is a non-altitude reporting (NAR) aircraft, then the bracket pulses F1,F2 will be transmitted but no data pulses. Altitude reporting aircraft, however, will include up to 13 time discrete data pulses (C1 A1 C2 A2 C4 A4 X B1 D1 B2 D2 B4 D4) transmitted within specified data time intervals between the bracket pulses F1,F2 depending on the target's altitude. The data pulses have a nominal duration of 0.45 $\mu$sec, and a nominal pulse interval of 1.45 $\mu$sec between pulse leading edges. Specified also are tolerances for pulse durations and intervals for valid pulses.

By convention, the data time intervals are grouped in four sets of three intervals per set, and are labeled A, B, C and D. Each set corresponds to three bits of an octal digit. For example, there are A1, A2 and A4 bits that define the A digit of the octal code. The entire four digit octal code, therefore, comprises twelve bits grouped in the four groups A, B, C and D and this octal code is used to represent the altitude of the responding plane.

In Mode C, the D1 and X bits are not used, and certain combinations of the C bits are not valid. The A, B and D bit combinations represent altitude in 500 foot increments, while the C bits represent 100 foot increments.

In standard TCAS I format, the four digit octal code A, B, C and D is a Gray code. The Gray code is specified so that one bit changes state for each incremental change in altitude. The particular Gray code used for TCAS I systems is known to those skilled in the art and forms no particular part of the invention other than to the extent that it is this code that is used as the example of a code to be determined in accordance with the present invention. It is another basic function of the reply processor, therefore, to determine the octal code that is associated with each identified reply signal so that the altitudes of the targets relative to the interrogating plane can be determined.

As stated, an important function of the reply processor 40 is to identify data pulses that can be clearly matched to a single reply signal or shared by more than one reply signal to produce a reply code report for each target. In general, this is accomplished by first identifying or matching two bracket pulses to form a bracket pair for a reply, and then identifying those pulses that were received between the bracket pair that can be matched as data pulses belonging to that reply. As used herein, the terms "matching" and "associating" as used in the context of related pulses are used interchangeably.

In the process of matching the pulses received, the reply processor determines a confidence factor associated with each pulse as an indication of whether the pulse was cleanly identified as belonging with a particular reply signal or whether the pulse was garbled to the point that it may or may not belong to a particular reply signal. The concept of a confidence factor is an important aspect of the invention. When the received pulses are decoded and assigned to their respective reply signals, the presence of noise and overlapping reply signals may result in pulses that cannot be cleanly identified with a particular reply signal. These pulses are considered "garbled" and are flagged as such using a confidence factor, which in this case is a data bit attached to the pulse information that indicated either the pulse was cleanly associated with a reply or is garbled. When the corresponding reply code is formed using the pulses and absence of pulses to assign the code data bits (the 1s and 0s), each data bit is tagged with a "garble bit". The garble bit is basically the same as the confidence factor. In the case of a "1" data bit (indicating a pulse was detected during the associated data time interval for that data bit), the corresponding garble bit indicates whether there is high or low confidence that the pulse was actually there and belongs to that reply. In the case of a "0" data bit (indicating that a pulse was either not detected during the associated data time interval for that data bit, or that pulse was initially detected but later claimed by a different reply), the corresponding garble bit indicates whether there is a high or low confidence that no pulse is associated with that data time interval for that reply signal. Each reply code report issued by the reply processor includes a garble bit for each data bit of the altitude code.

As used herein, then, a "confidence factor" refers to confidence associated with a detected pulse during a data time interval, or confidence associated with absence of a pulse during a data time interval; while a "garble bit" refers to the same confidence concept with respect to the data values assigned to the data time intervals as part of the reply code.

In addition, a bracket pulse may be identified as garbled by the reply processor 40 as will be described hereinafter. A garbled bracket pulse can be shared among different reply signals, similar to data pulse sharing among reply signals, until such pulse is cleanly claimed by a reply. After a garbled bracket pulse of one reply is cleanly claimed by another reply (as a bracket pulse or a data pulse), the reply that once used that pulse (as a garbled bracket pulse) is rejected if it had not claimed any other pulses "cleanly" or if it were a NAR reply. Moreover, any reply signals that may have shared that pulse will have their bits that correspond to that pulse properly modified.

As a general description of the reply processor operation, bracket pulses are identified and matched based on time of arrival (TOA) information, I/Q signal information, relative amplitude information and angle of arrival (AOA) information available from the top antenna signals, as well as time and relative amplitude information available from the bottom antenna signals as previously described herein. Other pulses, received and detected between the bracket pulses, are matched as data pulses to their correct bracket pulses by first determining a reference pulse from one of, or a combination of, the bracket pulses; and then comparing TOA, AOA and relative amplitude information for each potential data pulse to the corresponding information for the reference pulse.

Therefore, in accordance with an important aspect of the present invention, selection of the reference pulse is an important part of the reply signal decoding process. Proper selection of the best reference pulse is also important with respect to the determination of the correct confidence factor for each data pulse associated with a reply signal (and hence the garble bits for each data bit of the code).

The reply processor 40 then makes available to the main processor 18 the determined reply codes and the corresponding garble bit for each data bit in the codes. The main processor 18 uses the reply reports including the reply codes and associated garble bits for target tracking of the responding aircraft. Once tracking of the responding aircraft is initiated, the main processor may use the garble bits in some cases to attempt to repair one or more of the data bits associated with the reply code to aid in target tracking.

The following is a general description of the configuration and operation of the reply processor 40, with respect to the reply signal detection and decoding and confidence determination function. Following this general description of operation, a more detailed explanation based on operational flow charts of the reply processing will be given.

Figure 3:
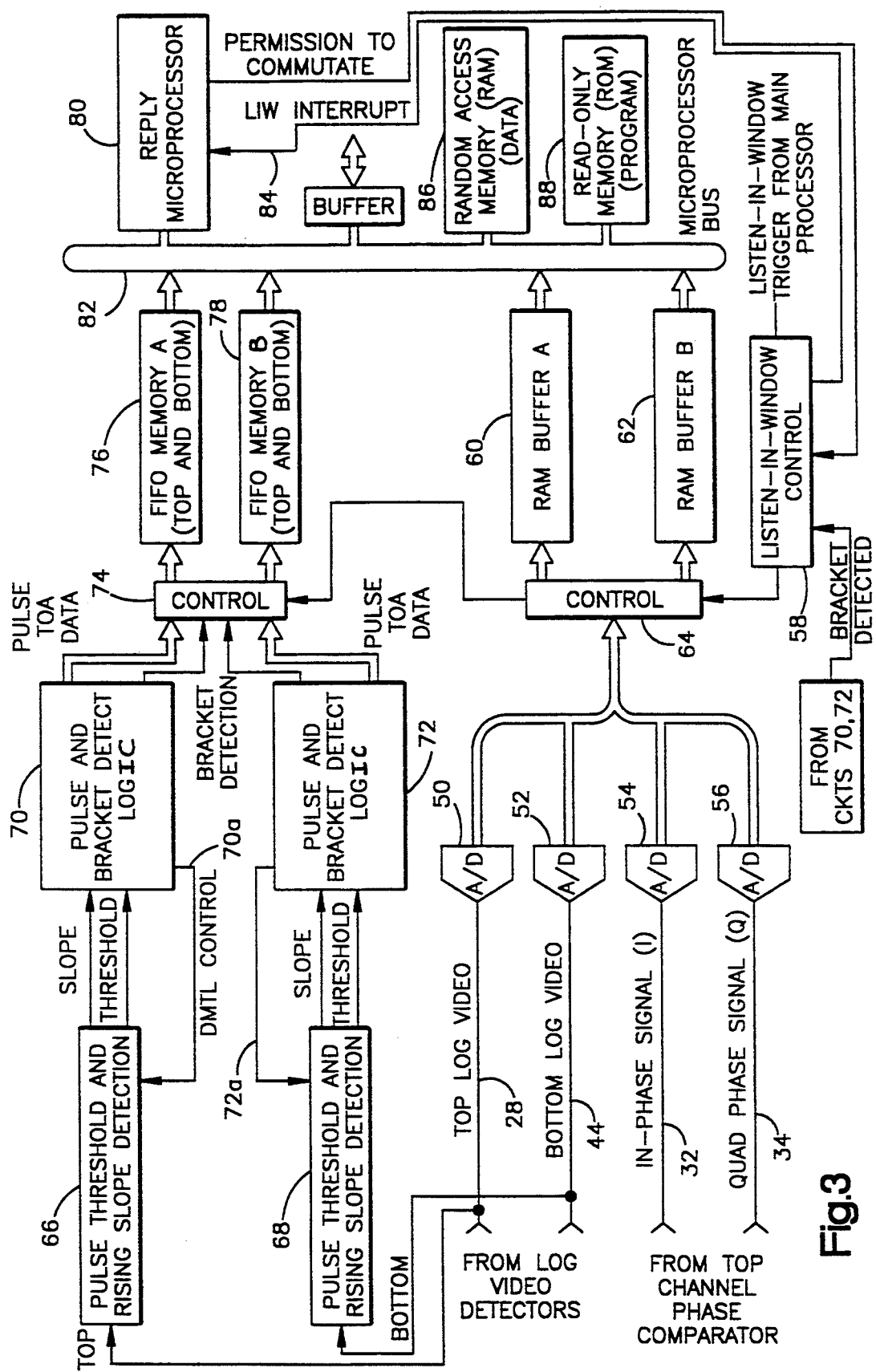
FIG. 3 is a functional block diagram of a reply processor circuit suitable for use with the system of FIG. 1 in accordance with the invention.

With reference to FIG. 3, the reply processor 40 receives the top and bottom antenna log video signals 28,44 and the top antenna I and Q signals 32,34 from the associated receivers as previously described herein. These signals are input respectively to analog to digital (A/D) converters 50,52,54,56. The A/D converters continuously digitize these input signals at a sampling rate of, for example, 20 MHz (50 nanosecond resolution) to permit storage of the signals in digital form in RAM. When the LIW signal 48 is received from the main processor 18, a listen-in-window control circuit 58 selects a RAM buffer for storing the digitized I, Q and log video signals. In the embodiment described herein, the reply processor 40 includes two RAM buffers (commutating RAMs) 60,62 also labeled buffer A and buffer B respectively in FIG. 3. Two RAM buffers are used in the described reply processor 40 so that reply signals received during a previous LIW period can be analyzed while at the same time reply signals from subsequent interrogation cycles can be stored. The LIW control circuit 58 selects the appropriate RAM buffer 60,62 by means of a conventional multiplexer control circuit 64. Thus, the reply signals are stored in the RAMs 60,62 in time order of arrival and hence the range of the responding aircraft can be derived by transforming the aircraft's corresponding reply signal RAM address (to a resolution defined by the A/D sampling rate) into nautical miles using the speed of light as that of the signal.

The top and bottom (antenna) log video signals 28,44 are also input to respective top and bottom pulse slope and threshold detection circuits 66,68. The pulse slope and threshold circuits 66,68 outputs are then input to respective pulse and bracket detect logic circuits 70,72. The basic function of the detect circuits 70,72 is to provide, for the top and bottom video signals respectively, pulse time of arrival (TOA) data for each detected pulse, and also an indication of whether a potential bracket pulse pair has been detected. In other words, the pulse detect circuits 70,72 are configured to identify all pulse pairs that are separated by the 20.3 $\mu$sec bracket time. When pulse signals that conform to the reply pulse format are detected, the detect circuits 70,72 also provide a threshold feedback control signal (70a and 72a) to the threshold and slope detect circuits 66,68 for dynamic control of the pulse thresholds.

The pulse detection circuits 66,68 are conventional in design and implement a dynamic minimum threshold level (DMTL) detection scheme. Each circuit 66,68 checks the slope or rise time of incoming pulses to filter out pulses that do not conform to the reply pulse format. Each DMTL circuit uses a dynamic threshold level to check the amplitudes of incoming pulses to filter out those which are more than a preset amplitude below that of an initiating pulse. The circuits 70,72 also verify that the pulse durations are longer than or equal to the minimum acceptable pulse time for a Mode C reply, in this case about 250 nanoseconds.

The detection circuits 66,68 thus provide two output signals respectively, namely pulse slope and threshold level values for each detected pulse. These values are input to the respective pulse detect circuits 70,72 which output the TOA and potential bracket detect information as indicated in FIG. 3. At this point in the signal processing the bracket pairs are only considered to be potential pairs because no analysis has been performed on the pulse data to determine if the pulses are garbled or otherwise not related to each other as part of a single reply signal.

The LIW control circuit 58 also controls a second multiplexer control circuit 74, which controls data transfer to a pair of memory devices 76,78 in synchronization with the transfer of the digitized signals into the RAM A,B buffers. In this case, the memory devices 76,78 are first-in-first-out (FIFO) type devices. Two sets of two FIFOs, one for the top antenna and one for the bottom antenna, with each set corresponding to one RAM buffer, are provided for the same reason as the use of the two RAM buffers 60,62. The use of two memory sets allows for a reply microprocessor 80 to read data for one LIW period while data is being written to the memories for a subsequent LIW period.

The FIFO memories are used to store the TOA and potential bracket pair detection information if any (such data being in the form of corresponding RAM A,B addresses) for each pulse detected by the detect logic circuits 70,72. The data stored in the FIFOs are address pointers to the real time digitized pulse data being synchronously (though not necessarily coincidentally) and parallel stored in the RAM buffers 60,62. For example, an address counter (not shown) used for controlling data written to the RAMs A,B can synchronously be used for storing the address pointers written into the FIFOs.

Whenever the bracket detect circuits 70,72 detect two pulses separated by 20.3 $\mu$sec, the later pulse is flagged as a potential F2 pulse and its temporal location in the RAM buffer is stored as an address in the FIFO memory based on its TOA determined by the logic circuits 70,72. TOA information for all detected pulses is stored in the FIFO memories in the form of an address that indicates where the corresponding pulse data can be found in the corresponding RAM buffer. For example, the RAM address used as a pulse address pointer stored in the corresponding FIFO can be selected based on the pulse TOA, and may correspond to the time of arrival of the first data sample that crosses the pulse detection threshold used by the pulse detection circuits 66,68.

Therefore, the reply microprocessor 80 reads the data from the FIFO memories to access the address data corresponding to the RAM location of pulses that were detected as potential reply pulses. Appropriate time offsets are applied to the flagged data to account for propagation delays of the signals in the hardware from the antennas to the FIFOs and RAMs. The FIFO data is used by the microprocessor 80 to ascertain quickly the pulse TOA and where in the RAM buffers the digitized pulse data can be found. The data stored in the RAM buffers, as described herein, are the I, Q, and log video signals for all the received signals. The microprocessor 80 accesses the FIFO memory information and the RAM buffer information by a microprocessor data bus 82 in a conventional manner.

The LIW control circuit 58 also provides an interrupt signal 84 to the reply microprocessor so that the reply microprocessor can transfer data from the RAM buffers and FIFO memories to its own RAM 86 at the end of an LIW cycle. This configuration allows the microprocessor to analyze data for an LIW period while at the same time new data from a subsequent LIW period can be received and stored.

The FIFO memories and RAM buffers are thus synchronously operated in parallel during a LIW period so that when the listen window closes, in this case up to 400 $\mu$sec after the interrogation signal was transmitted, the microprocessor has available the pulse information obtained from the receiver circuits, as well as the pulse detection pointers and potential bracket pulse information. The bracket detect logic circuits 70,72 (which in the described embodiment are implemented in hardware) send a bracket detect signal to the reply microprocessor 80 at the end of the LIW window if at least one potential bracket pair of pulses has been detected. This interrupt causes the microprocessor temporarily to stop processing data from other LIW cycles and to transfer the FIFO and corresponding RAM buffer data for the latest cycle to its memory 86, and queues the acquired data for further processing.

Control software for the reply microprocessor 80 may be stored in a non-volatile ROM 88 as is well known to those skilled in the art.

Suitable components for the reply processor 40 will now be described, it being noted that these are but one example of many suitable devices available to the designer. The reply microprocessor 80 can be a 20 MHz, 32 bit 80960 KB microprocessor available from Intel, and programmed in a manner well known to those skilled in the art according to the manufacturer's specifications to implement the software control functions described in detail herein. The ROM memory 88 interfaced with the microprocessor 80 can be realized with the use of EPROM (Erasable Programmable Read Only Memory) devices such as part no. AM27C512 available from Advanced Micro Devices, and the data RAM 86 interfaced with the microprocessor 80 can be realized with static RAM devices such as part no. IDT71256S25TP available from Integrated Device Technology. The commutating RAM buffers 60,62 can be implemented using RAM devices such as part no. IDT71981S25P available from Integrated Device Technology. Although separate RAM buffers are shown in FIG. 3, those skilled in the art will appreciate that a single RAM device such as a dual port RAM could also be used that has adequate memory locations and is partitioned to allow data read and write functions. Data is written to the RAMs in 8 bit format for the I, Q top antenna signals and the log video signals for the top and bottom antennas.

The FIFO memories can be realized using part no. IDT7201SA50TP available from Integrated Device Technology. These FIFO devices allow for storing the locations of up to 256 distinct detected pulse address pointers. The RAM address pointer information for each detected pulse is contained in two FIFO locations that are consecutively stored. In addition, the most significant bit of the most significant byte of the FIFO address data for each pulse is used to indicate whether that pulse is a potential F2 as determined by the bracket detect circuits 70,72.

When the LIW closes, as controlled by the main processor 18, if the detect hardware 70,72 has detected at least one potential F2, the reply microprocessor 80 is interrupted and it transfers the FIFO contents and corresponding RAM buffer contents for the pulses to the microprocessor RAM 86. The microprocessor 80 then releases the RAM commutation control circuit 64 by issuing a "permit commutation" signal so that the RAM buffers can be filled again during the next LIW period.

For purposes of the following discussion, we will assume that at least one potential bracket pair was detected so that a potential F2 pulse was flagged in the FIFO memory, and further that the microprocessor 80 has transferred the FIFO information (pulse TOA and potential F2 flags) and corresponding RAM buffer pulse data (digitized pulse I, Q and log video signals) to the microprocessor RAM 86. The reply processor 80 program is designed to analyze this data to determine if a valid reply signal was received, identify the F1,F2 pulse pair, as well as detect and decode any data pulses that can be matched to the F1,F2 pair. For clarity and ease of explanation, the description herein will be primarily in the context of identifying a single F1,F2 pair (corresponding to a single reply signal), but those skilled in the art will appreciate that the same logical process or algorithm can be used to detect multiple reply signals received during an LIW period. In other words, the criteria described herein for matching pulses with a single reply signal is used repeatedly for all available potential F1,F2 pairs and pulses detected during the LIW period, and such processing continues until all the data available has been analyzed. The matching process described herein will include an explanation of reply signal processing for signals received by the top and the bottom antennas.

The information available to the reply processor for each detected pulse in a reply signal is the pulse I and Q signal information from which an AOA value for the pulse can be determined (for pulses received by the top antenna), a TOA value that indicates when the pulse was received (top and bottom antenna signals), and pulse amplitude information (top and bottom antenna signals). In accordance with an important aspect of the invention, whenever the microprocessor 80 accesses digitally stored pulse data such as I, Q and amplitude, the data samples selected are based on a delay from a selected reference point of the pulse. In other words, if a 450 nanosecond pulse was received and stored, and the digitized signals in the described embodiment were produced at a sample rate of approximately 50 nanosecond intervals, then the microprocessor has about nine data samples for data processing. (Those skilled in the art will readily appreciate that sampling rates can be varied as needed for specific applications, so that the number of samples per pulse, in this case nine, is but one example.) The first data sample will approximately correspond to a point on the rising edge of the pulse. We have found that the initial data samples, however, do not always provide reliable data characteristics of the pulses, such as I/Q and amplitude. Therefore, the reply microprocessor 80 control software uses a time offset so that the microprocessor selects data sample points that begin, for example, four samples from the leading edge samples. The amount of delay can be based on empirical data for each application.

In general terms, the reply signal analysis for top antenna signals includes the steps of identifying F1,F2 bracket pairs in which at least one of the bracket pulses has clean I/Q data, as described hereinafter. If both pulses are garbled then the pair is rejected from further processing, although either or both garbled pulses could possibly be claimed by other detected bracket pulses, provided the 20.3 μsec period between the pulses is met. If only one of the bracket pulses has clean I/Q data, then relative pulse amplitude is used for determining whether the pulses can be matched as a bracket pair. After a bracket pair is identified, one or a combination of both of the pulses is selected as a reference pulse. The reference pulse is then used to associate or match (i.e. decode) detected data pulses to the bracket pair. The data pulses are then used to assign the data time interval bits (data values) to build a reply code that represents the responding aircraft altitude. In the case of reply signals received by the bottom antenna (no I/Q data available), a reference pulse is selected based on the relative amplitudes of the F1/F2 pulses, as will be described in greater detail herein. For ease of explanation hereinafter, reference to the use of pulse or signal I/Q information will be understood as referring to pulses/signals received by the top antenna.

As stated, a confidence factor is assigned to each detected pulse as to whether the reply processor was able to cleanly match the pulse to a reply signal or whether the pulse was garbled. When a pulse is identified as "cleanly belonging" to a reply as part of the altitude reply code, it is used with only that reply and taken out of circulation so that no other reply can use it. By "out of circulation" is meant that a pulse that was available for matching to a reply signal (was "in circulation") has been cleanly matched to a reply and is no longer available to other reply signals. The term "circulation" is simply a reference to the fact that pulse data is available to the software to match the pulse to any reply signal until a clean match is found. If another reply signal had used or shared a now cleanly matched pulse, then that other reply is modified by removing the corresponding data bits assigned from that pulse. It is important to note that the deletion of a data pulse from a reply signal that had shared it results in a "0" data value for that time interval (assuming no other pulse is matched to the reply for that same interval), and this "0" data value is flagged as garbled.

If the now cleanly matched pulse had previously been used as a bracket pulse (keeping in mind that garbled bracket pulses can be shared until cleanly claimed), then the reply that had shared that pulse (as a garbled bracket pulse) is discarded as false and later deleted if it did not claim any other pulses cleanly, or if it was a NAR reply.

When a pulse is identified as partially matching a reply (e.g. some but not all of the information available—such as AOA or amplitude—about the pulse matches to a reference pulse), it is flagged as garbled and kept in circulation so that other replies can share it, or until cleanly claimed by another reply. According to an important aspect of the invention, linked lists are maintained using two-way mapping in the memory 86 to keep track of all pulses (clean and garbled) that are being shared by multiple replies, used in one reply, or not used in any reply. By using the two-way mapping, the system 10 always knows which replies are using which pulses and how well they belong (i.e. whether they are cleanly matched or garbled); and the system also knows for each pulse where it is being used. Thus, the linked lists provide a way to permit pulse sharing, claiming and deletion among different reply signals.

All reply signals are processed in temporal order for the top and bottom antenna signals. As a final step, the data from the top and bottom antenna are merged into an LIW report containing all responding aircraft information (e.g. range, altitude code, confidence factors (garbles bits), bearing, and amplitude, along with processor status information and other data as desired), which report is issued by the reply processor 40 to the main processor 18, which in turn uses this information to establish target tracking and reply code repair (if necessary).

The system 10 is also provided with a display and aircraft interface control 36. This control unit can be used, for example, to provide a visual display of target tracking for the crew, and also to receive aircraft information such as the interrogating aircraft altitude so that target altitudes relative to the interrogating aircraft can be computed and displayed.

Figure 4A:
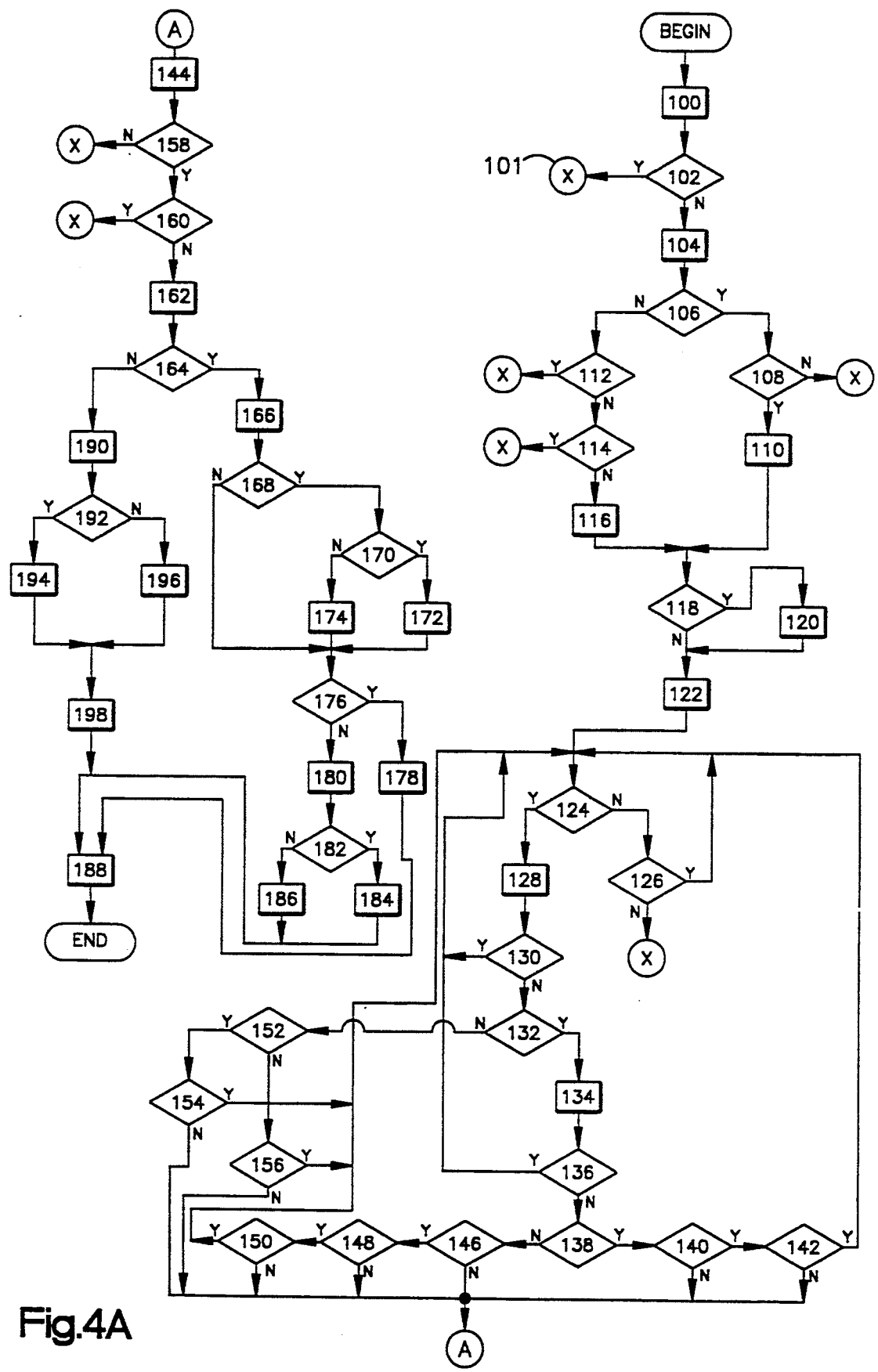
FIG. 4 (parts A and B) is a flow diagram with explanatory text of a bracket pair detection process according to the invention.

The detailed description hereafter of the bracket pulse pair detection process will refer to FIG. 4 which provides a detailed flow diagram for the bracket pair detection process.

To determine a bracket pair, the microprocessor 80 first obtains at step 100 the data that has been transferred from the FIFO memory to locate a pulse flagged as a potential F2 pulse. The potential F2 pulse is checked at step 102 to determine if it is out of circulation (i.e. already matched cleanly to another reply), and if it is then the potential bracket pair is rejected (step 101). If the potential F2 pulse is for the first reply (step 106) from the antenna data being processed, then the FIFO and RAM buffer positions are checked at step 108 to verify they are valid (e.g. the potential F2 pulse could have been detected and stored in a memory location that corresponds to an invalid F2 TOA). It is important to keep in mind that the data stored in the RAM buffers corresponds to the actual time of arrival of the pulses after the LIW window opens following an interrogation signal transmission.

If the F2 pulse is not from the first reply received, the system checks at step 112 whether the F2 was detected very close to a previous reply F2 pulse, and if it was not then at step 114 the potential reply is checked to determine if it is a phantom SPI reply composed of a previous reply C2 and SPI pulses corresponding in time separation to potential F1 and F2 pulses respectively. If the potential F2 pulse is determined to be detected very close to a previous reply F2, or if it is determined to be the SPI of a previous reply, the pair is rejected. Assuming the F2 pulse is accepted by successfully passing these tests, the F1 search parameters are then computed at step 116 (or 110 if it is the first reply). The F1 time can be computed because a valid F1 will have to be present 20.3 microseconds ($\pm$/tolerance) before the F2 time.

If the F2 pulse is from the top antenna 12 (checked at step 118), then the software at step 120 determines if the I/Q data of the F2 pulse is clean.

Figure 6:
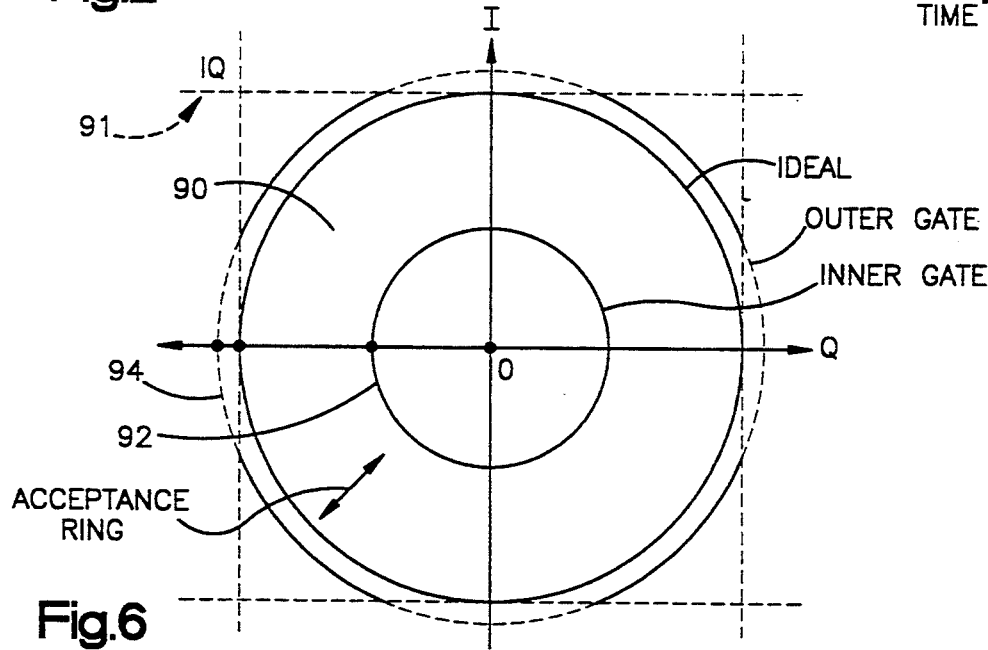
FIG. 6 is a representative plot of ideal I/Q data and a software embedded gate about the ideal values.

It should be noted at this time that the software will check all potential F1 and F2 pulses to determine if their I and Q signals are clean or not. This is done as part of the determination of which pulse (or both) of a bracket pair should influence the composition of the reference, and also whether the pulse can be used or claimed by another reply. With reference to FIG. 6, because the pulse I and Q signals ideally represent the sine and cosine of the pulse AOA, their polar plot should be a perfect circle of some predeterminable radius, as represented by the circle 90. However, the I and Q signals are sensitive to noise and distortion, especially in environments with synchronous garble and fruit. Therefore, the I and Q values will rarely plot onto a perfect circle. The software accommodates for this by allowing a certain tolerance of error in the I and Q signals, and this is represented by inner and outer circles 92,94 that define a gate about the ideal I/Q circle 90, within which I and Q data will be accepted as clean. In FIG. 6, the gate widths are shown in an exaggerated manner for clarity (also note that the box identified with the numeral 91 graphically encloses or represents the possible values for I and Q). If the signals fall outside the gate they are flagged as garbled. If the I and Q signals fall inside the gate then the corresponding pulse is flagged as having clean I/Q. In other words, the gate acts as an I/Q filter and is referred to hereinafter as a donut or ring test. Hereinafter, the abbreviation I/Q will be used to refer to a value or result determined by the combination of a pulse's I and Q signals. For example, an AOA is an I/Q value; and I/Q being clean or garbled refers to the result of the I and Q signal donut test. The gate size can be dynamically controlled if desired, for example, as a function of range of the target that issued the reply signal from the interrogating aircraft.

The I/Q donut test is performed on all potential F1 and F2 pulses. A F1/F2 pair is discarded if both pulses have garbled I/Q.

Referring again to FIG. 4, at step 122 the software searches the FIFO position indicators for a pulse that occurred at the correct F1 time period of 20.3 μsec before the potential F2. At step 124 if the current pulse (potential F1) does not meet the 20.3 μsec requirement, then at step 126 the software continues looking through all other possibilities. When a possible F1 is found at step 124, based on the 20.3 μsec period test, that potential F1 is flagged and saved at step 128 as a possible bracket pair with the F2 pulse and at step 130 the software checks if that F1 pulse is out of circulation. If it is out of circulation the software returns to find other possible F1 matches.

If the possible F1 is in circulation and from the top antenna 12 (step 132), the F1 I/Q is checked at step 134 using the donut test to see if it is garbled or clean. At step 136, if it is determined that both F1 and F2 have garbled I/Q, then the pair is rejected and the search continues for another F1 If F1 only is garbled (step 138), then at steps 140 and 142 the software checks if the amplitudes of the F1 and F2 pulses are close enough (in this case the amplitudes must be within about 5 dB of each other) to validate the F1 pulse at step 144.

If the F1 I/Q is not garbled (as checked at step 138), then at step 146 if F2 also is not garbled, then the F1 pulse is validated at step 144. If the F2 pulse is determined to be garbled at step 146 (but F1 is clean) then at steps 148 and 150 the amplitudes of F1 and F2 are checked whether they are close enough to validate the F1 pulse (similar to steps 140 and 142). Thus if either of the F1 and F2 pulse I/Q is clean and their amplitudes match well, they are declared a bracket pair for the reply being analyzed (although if either is garbled it could later be claimed cleanly for another reply).

If the potential F1 came from the bottom antenna (a not at step 132), the amplitudes of the F1 and F2 pulses are checked at step 152 and at steps 154 and 156 the bracket pair is validated (F1 accepted at step 144) if the amplitudes are sufficiently close (for example, within about 2 dB) that the signals are not deemed garbled. Otherwise, this potential F1 pulse is discarded and the search for a better matching F1 continues by returning to step 124.

It is worth noting here again that the pulses received at the top and bottom antenna are initially analyzed in temporal order as stored in the RAM buffers and FIFO devices. After all pulses have been analyzed and either matched or discarded, the information from the two antenna are combined to produce the final report containing the reply codes to the main processor. The top antenna information is the primary source because it contains the AOA information, however, it is sometimes possible to obtain useful reply code information from the bottom antenna even when the top antenna signals are garbled or missing.

When the F1/F2 pair has been identified at step 144, at step 160 the F1 is checked for whether it is too close to a previous reply F1 pulse. If so, the potential bracket pair (F1/F2) is rejected. At step 162 the F1 and F2 time positions in memory are stored as part of the final reply code report which will be used for tracking.

If the F1 and F2 pulses came from the top antenna 12 (step 164), then at step 166 the pulses are flagged as being from the top antenna and the respective AOAs are calculated. If at step 168 both pulses have clean I/Q signals (as was previously determined by the donut test), then at steps 170, 172 and 174 the cleanness of the bracket pair can be reassigned based on whether the amplitudes and AOAs of the signals are sufficiently close. For example, the F1 and F2 pulses may have been declared clean based on their respective I/Q data, however, their relative amplitudes or AOA may deem one of them garbled. A check on the relative amplitudes of F1 and F2 is administered to verify whether the pulses are within about 2 dB from each other. And a check on the relative AOAs is also done to verify whether the pulses are within about 20° of each other. "Cleanness" of the F1/F2 match is reassigned based on the results of these tests.

At step 176 it is determined whether F1 and F2 are still clean and if so at step 178 the code is assigned an accurate AOA flag and the average amplitude and AOA of the signals will become those of the reference pulse. If one of the pulses is not clean, then an inaccurate AOA flag is assigned at step 180, and at steps 182, 184 and 186 the software selects the clean pulse (either F1 or F2) as the reference, and the code retains an inaccurate AOA flag.

If the F1 and F2 signals had arrived from the bottom antenna (step 164), then at steps 192, 194 and 196 the pulse with the smaller amplitude is selected as the reference pulse, and the average amplitude of the two pulses is the data used, along with the AOA set to zero (assigned at step 198). At step 188, for both top and bottom antenna data, the pulses are then either removed from circulation, if clean, as previously described, and their usage if any in other replies is appropriately deleted from the reply/pulse mapping (linking) lists, or if garbled, their usage is adjusted to reflect the most current users of the pulses. The F1/F2 decoding process is then complete. Regardless of which antenna the pulses are picked up by, the pulse that has the lesser amplitude is selected for the reference (assuming both pulses are clean based on I/Q, AOA match and amplitude match) because the lesser amplitude pulse is less likely to be garbled.

The reference pulse thus contains AOA and amplitude information that will be used to match other pulses as data pulses that were received and detected between the bracket pulses now matched to a single reply signal. The reference pulse amplitude, AOA and the F1 TOA represent the reply signal as a whole (for tracking purposes), and the decoded data bits represent the reply code in combination with the reference signal which is used for target tracking and display.

Figure 5A:
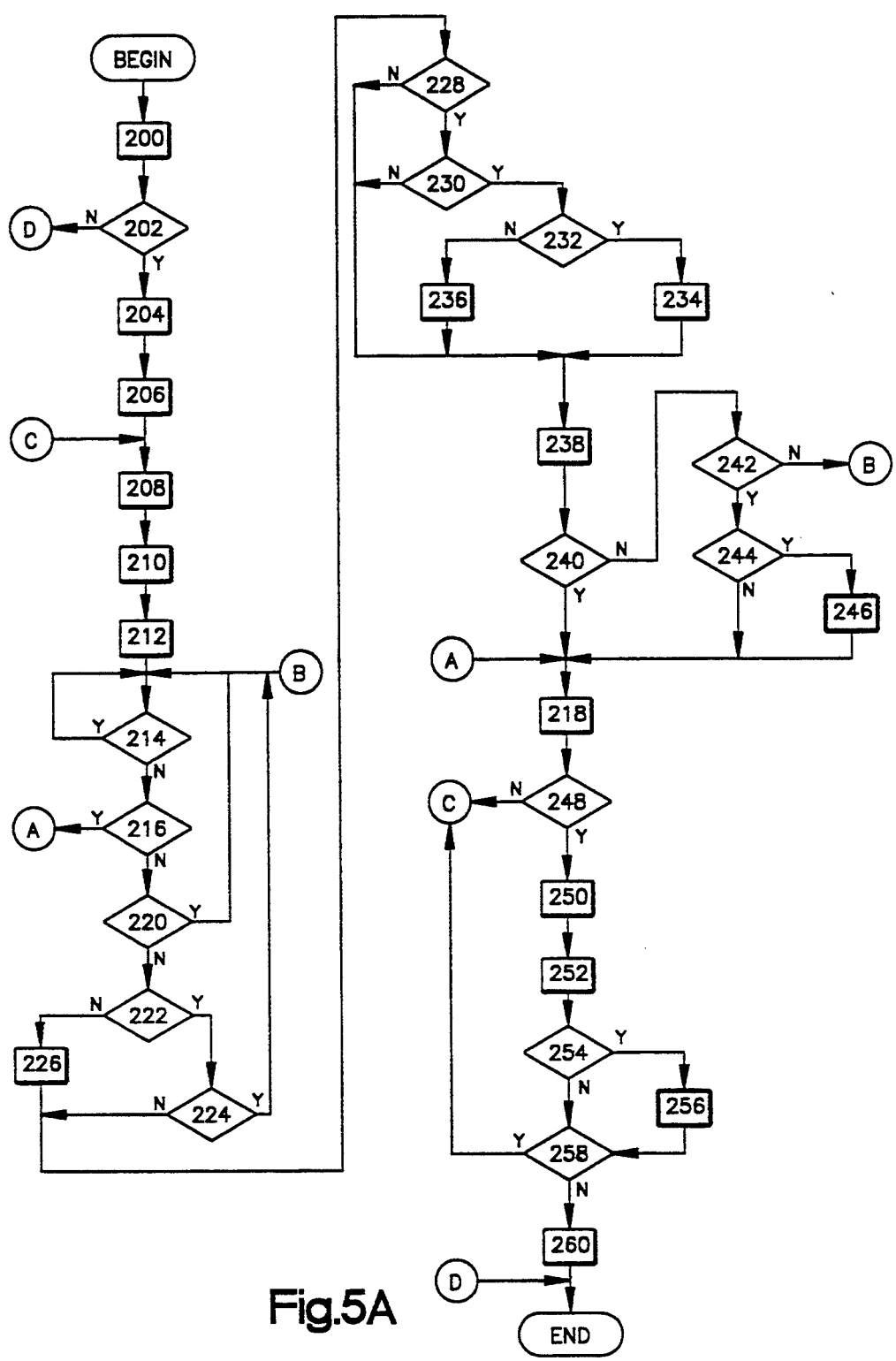
FIG. 5 (parts A and B) is a flow diagram with explanatory text of a data pulse decoding process according to the invention.

With reference next to FIG. 5, after the reference pulse has been identified and parameter initialization, at step 202 the software checks whether any pulses were detected and flagged into the FIFOs occurring between the F1 and F2 pulses. If none were flagged, the reply will be treated as an empty bracket. If any were flagged, then starting from the F1 time position, other pulses are searched for at step 206 that potentially are pulses representing data code bits (C1 through D4). Because associated data pulses are transmitted by the responding plane at the discrete intervals identified in FIG. 2, the software can look sequentially for each of the data bits starting with the C1 bit (remembering that C1 is one of three bits that make up the C digit of the octal code for 100 foot increments in the Mode C altitude reply code). Thus, at step 208 the software keeps track of which data bit is being searched for.

At step 210 the time delay from the F1 pulse to a possible data pulse is determined. After further initialization, at steps 214 and 216 a check is made to determine if there is a pulse found that meets the TOA criteria for the particular data bit being searched (i.e. a pulse accurately falls within the corresponding data time interval for the bit being searched). If not, then the program branches to step 218 (via path A) and terminates searching for that bit, e.g. C1. If a pulse was found within the data time interval for the bit being searched, then at step 220 that pulse is checked to see if it is out of circulation.

If the pulse is not in circulation, the program returns to step 214 to check other pulses for more possibilities. If the pulse is in circulation, then at steps 222, 224 and 226 the relative amplitudes of the data pulse and reference pulse are compared. If the data pulse amplitude closely matches the reference pulse amplitude within a predetermined gate then a clean flag (confidence factor) is assigned to the data pulse at step 228. If the data pulse amplitude fails the comparison test with the reference pulse, it is either flagged as garbled if within a predetermined gate of the reference amplitude, or is discarded if outside that gate.

Figure 7:
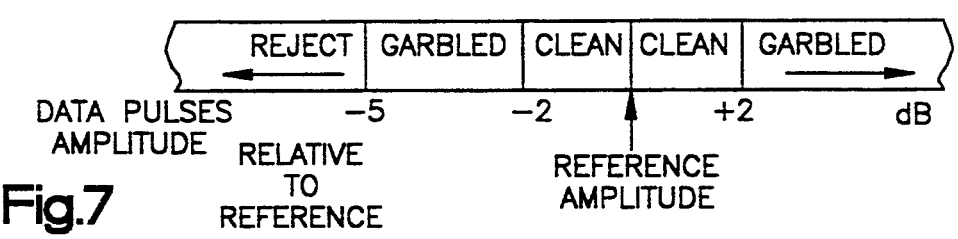
FIG. 7 is a diagram of relative amplitude values that describe ranges of amplitudes used as software embedded gates used to filter data pulse information with respect to a reference pulse during data pulse decoding.

For example, in FIG. 7, we show a suitable amplitude gate arrangement which in effect acts as a filter for data pulse verification. The reference pulse amplitude is located in the middle of the gate. Data pulse amplitudes that fall within about 2 dB on either side of the reference (i.e. higher or lower in amplitude) are flagged as clean. If the data pulse amplitude exceeds 2 dB of the reference it is automatically flagged as garbled. If the data pulse amplitude is lower than the reference amplitude but within 5 dB it is flagged as garbled; but if the data pulse amplitude is more than 5 dB below the reference pulse amplitude, the pulse is rejected. Note again that if a pulse is not found within the appropriate TOA period for the code bit being searched from F1, then the value of that bit is assigned a zero.

If the data pulse was received by the top antenna (step 230), then at step 232 if the data pulse AOA is within a predetermined gate of the reference pulse AOA, then a clean flag or high confidence is assigned to the data pulse (step 234). If the AOA is outside the gate then the data pulse is flagged as garbled (step 236). At step 238 the data pulse being searched for is designated as found and its FIFO position is stored in memory 86. Note that if at step 230 it was determined that the data pulse came from the bottom antenna, the AOA check at steps 232, 234, 236 is not performed.

At step 240, the data pulse is checked if it is clean and if so the search for that particular pulse is complete at step 218. If the data pulse was flagged as garbled, at step 242 a check is made to find out whether the number of garble pulse matches equals two. In other words, it is possible that more than one pulse was received and detected that fell within the allowable data time interval for the particular data bit being searched for. The reply processor circuits are configured to not flag any two pulses (from the same antenna) closer than about 200 nanoseconds apart. Hence no more than three pulses within the time interval gate of a particular reply pulse (about 500 nanoseconds) would be flagged. If one garbled data pulse was detected as noted at step 242, the software branches back to step 214 in an attempt to search for and identify a clean pulse or another garbled pulse that matches the reference with respect to the data bit being searched for. If only one garbled pulse that matches TOA is detected, that pulse will be selected. If two garbled pulses are detected, the closer one to the nominal pulse time position is more likely to belong, and hence the software will select the one that best matches the TOA criteria of the desired pulse at steps 244 and 246. If they are equidistant from the nominal time position, then one of them will be selected. If three garbled pulses are detected, the middle one is more likely to belong. Hence checking the first two pulses when two or more are flagged as garbled will suffice. However, a clean pulse that matches the TOA of the desired pulse, if detected, will always take precedence and will be selected.

At step 248 if a data pulse was not found within the specified data time interval for the bit being searched, the program branches back to step 208 (via path C) and begins searching for the next data bit. For example, after the search for a C1 pulse is exhausted, the next data bit searched for will be A1 (see FIG. 2).

If a data pulse was found and cleanly matched to a reply, then at step 250 that data pulse is taken out of circulation, the linking tables are checked to update all other replies that shared the now cleanly matched data pulse, and at step 252 the data pulse is mapped to its equivalent code bit and the reply code is updated accordingly. In other words, after each data pulse has been clearly identified, one more piece of the total reply code is determined. At step 254, a check is administered to determine whether the matched data pulse is not clean. If not clean, then that data pulse confidence factor (i.e. its corresponding garble bit) is mapped to the reply code and updated at step 256. Otherwise the garble bit is used to indicate the pulse was clean. So long as a pulse remains flagged as garbled, it remains in circulation and can be claimed by another reply, or shared by multiple replies.

At step 258 the program checks whether any more pulses were found between the current data pulse and the F2 bracket pulse, and if so branches back into the loop at step 208 (via path C) to try to match those additional pulses with the reply. After all pulses belonging to this reply have been analyzed and identified, the reply decoding process will be complete for this bracket and the reply and garble codes are appropriately updated at step 260.

The program then iteratively executes the same process of FIGS. 4 and 5 until all the subsequent (later in time) flagged brackets on the top antenna are analyzed and decoded. The false replies (i.e., possible replies for which garbled F1s or F2s were later cleanly claimed by other replies) detected in the process are then deleted and the reply lists are adjusted accordingly. A similar procedure is then executed to decode the replies detected by the bottom antenna. When done processing the data of both antennas, the software then merges the processed top and bottom antenna replies in time as they were detected, combining similar replies that were detected simultaneously (within some time tolerance) on both antennas. The merged LIW reply data is then formatted into a LIW report containing replies as well as other relevant information and is then passed to the main processor for further use in tracking.

Among other data items, the LIW report contains reply codes and parallel (bit by bit) information representing garble (confidence) codes of the decoded replies (the garble bits for a given reply signal collectively form a garble code as that term is used herein). The combination of this data represents the confidence in the data value that the reply processor has assigned to each of the data time intervals (data bits) of the decoded reply. Hence each reply code bit is associated with one of four levels of "probability of belonging" to a particular bracket pair:

| Code Data Value | Garble | Pulse |
|---|---|---|
| 0 | 0 | Not present; high confidence |
| 0 | 1 | Was present and garbled, but another reply claimed it; low confidence |
| 1 | 0 | Present and not garbled; high confidence |
| $\bar{1}$ | 1 | Present and garbled; low confidence |

As an example, suppose a reply code is determined as 6220 (ABCD=A4 A2 B2 C2) and its corresponding garble code is 2004 (ABCD=A2 D4), then this reply code/garble code combination represents the following bit information in the reply code:

A4: Pulse is high confidence, claimed as clean in this reply, not currently used in any other reply. Taken out of circulation.

A2: Pulse is present but garbled. May have been shared by multiple replies, but none claimed it as clean.

A1: Pulse is not present.

B4: Pulse is not present.

B2: Pulse is high confidence, claimed as clean in this reply, not currently used in any other reply. Taken out of circulation.

B1: Pulse is not present.

C4: Pulse is not present.

C2: Pulse is high confidence, claimed as clean in this reply, not currently used in any other reply. Taken out of circulation.

C1: Pulse is not present.

D4: Pulse was present but garbled. May have also been shared by multiple replies, but a reply later on was able to claim it as clean and then the program deleted its corresponding bits from all replies that may have shared it, and took it out of circulation.

D2: Pulse is not present.

D1: Pulse is not present.

The invention thus provides apparatus and methods for detecting and decoding reply signals even when multiple replies are received and overlap in time during an LIW period. The invention further includes a confidence measure for the decoded pulses and determined data values assigned to the reply codes.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A method for detecting and identifying a transponder reply signal of the type having a plurality of associated time discrete pulses including two bracket pulses and a number of related data pulses that may have been transmitted at discrete data time intervals between the bracket pulses such that the signal content detected during the data time intervals corresponds to the reply signal data code, comprising the steps of:

a. producing a video signal for each received pulse;

b. detecting potential bracket and data pulses based on said video signals;

c. pairing bracket pulses that mark the beginning and end of a reply signal code based on time of arrival (TOA) of said detected pulses;

d. identifying a reference pulse from said bracket pulses based on relative amplitude of said bracket pulses; and e. identifying data pulses, associated with said reply signal and detected between occurrence of said bracket pulses, based on said reference pulse to provide the reply code.

2. The method of claim 1 further comprising the step of determining which data time intervals included an associated data pulse and which data time intervals did not include an associated data pulse, and assigning data values to each time interval accordingly to produce the reply code.

3. The method of claim 1 wherein a receiver is used to receive a number of reply signals that can overlap in time, with said method being used to identify each reply signal and each reply signal's associated pulses.

4. The method of claim 1 wherein pulses received from overlapping reply signals may be garbled due to overlapping reply signals, and wherein the pulse matching steps of pairing bracket pulses and associating data pulses to a respective reply signal include having garbled pulses shared by more than one reply signal.

5. The method of claim 4 wherein said pulse matching steps respectively include the steps of tracking shared pulses so that when a pulse is claimed by a reply signal, said claimed pulse is removed from all other reply signals that had shared said claimed pulse.

6. The method of claim 5 further comprising the step of assigning a confidence factor to each pulse identified as belonging to a reply and assigning a confidence factor to each data time interval.

7. The method of claim 6 wherein each pulse received by a directional antenna is used to produce in-phase (I) and quadrature phase (Q) signals that correspond to bearing of the reply signal received by the directional antenna, said confidence factor for each data pulse associated with a reply signal received by said directional antenna being based on a comparison of the I and Q signals and amplitude signals of said data pulse with the corresponding reference signal of said reply.

8. The method of claim 6 wherein a high confidence factor is assigned to a data pulse that cleanly matches a reference pulse; a low confidence factor is assigned to a data pulse that is not cleanly matched to a reference pulse; a high confidence factor is assigned to a data time interval that had no pulse present therein, and a low confidence factor is assigned to a data time interval from which a shared pulse was removed.

9. The method of claim 8 further comprising, after all reply signals and associated pulses have been identified, the steps of:

a. producing a reply code for each reply signal by assigning a data value to each data time interval based on whether an associated pulse was present or not present during said time interval; and b. assigning to each time interval data value a garble bit that corresponds to the confidence factor assigned to the associated pulse when the data value is based on a pulse present in that time interval, and that corresponds to the confidence factor assigned to the time interval when an associated pulse was not present during that time interval.

10. The method of claim 9 wherein each garble bit has one of two values corresponding to high and low confidence that the data value assigned to a time interval is correct.

11. The method of claim 2 further comprising the step of assigning a respective garble bit to each data value wherein each garble bit corresponds to a confidence factor that the data value has been correctly assigned to its corresponding data time interval.

12. The method of claim 11 wherein the step of determining said confidence factor for a data value based on the absence of a data pulse during its corresponding time interval comprises the steps of assigning a high confidence factor if no pulse was detected during the corresponding time interval, and assigning a low confidence factor if a pulse was detected during the corresponding time interval but thereafter cleanly claimed by a different reply signal.

13. The method of claim 11 wherein said step of determining said confidence factor for a data value based on a pulse present during the corresponding time interval comprises the steps of using a directional antenna to detect reply signal pulses so that in-phase (I) and quadrature phase (Q) signals can be produced for each reply signal from the directional antenna, determining an angle of arrival (AOA) value from said I/Q signals and an amplitude value from said video signals for each data pulse and associated reference pulse.

14. The method of claim 13 wherein a confidence factor for a data pulse comprises a signal that indicates whether the data pulse is clean or garbled based on said amplitude and AOA values of the detected pulse relative to said reference pulse values.

15. The method of claim 14 wherein a data pulse is flagged as clean if its amplitude and AOA values are within first corresponding gates about said reference pulse values.

16. The method of claim 15 wherein a data pulse is flagged as garbled if its amplitude is above or below second corresponding gates about said reference pulse values, and is rejected if below a third corresponding gate about said reference pulse values.

17. The method of claim 16 wherein a data pulse is taken out of circulation as a pulse matched to a reference pulse if said data pulse is clean relative to said reference pulse, and the corresponding bracket pair is verified as valid when a clean data pulse is matched therewith.

18. The method of claim 16 wherein a data pulse is flagged as garbled when its AOA value is outside an AOA gate about said reference pulse AOA gate.

19. The method of claim 18 wherein a data pulse flagged as garbled and associated with a reply is tracked as a shared pulse and remains in circulation and can be matched to other reference pulses based on said amplitude and AOA values.

20. The method of claim 1 wherein said bracket pulses are matched to a reply signal as a bracket pair based on relative time of arrival (TOA) values and relative amplitude values, and further based on relative quality of their corresponding I and Q signals when received by a directional antenna.

21. The method of claim 20 wherein a potential bracket pair is identified based on relative TOA values.

22. The method of claim 21 further comprising the step of determining an I/Q value for each potential bracket pulse received by the directional antenna, said I/Q value being computed as a value corresponding to the bearing of a vector defined by said I and Q signals.

23. The method of claim 22 wherein a potential bracket pair is rejected if relative amplitudes of the pulses are outside a predetermined gate or if both potential bracket pair pulses have I/Q values that are garbled.

24. The method of claim 23 wherein a reply signal received by the directional antenna is available for pulse association if at least one of its potential bracket pulses has a clean I/Q value and the potential bracket pulses have relative amplitudes within said gate; and wherein a reply signal received by a non-directional antenna is available for pulse association if its potential bracket pulses have relative amplitudes within a predetermined gate.

25. The method of claim 24 wherein a clean I/Q value of a bracket pulse is determined as an I/Q value being within a predetermined gate about a unit radius circle defined by the I and Q signals of the bracket pulse, and wherein a garbled I/Q value is an I/Q value that is outside said predetermined gate.

26. The method of claim 20 wherein said reference pulse is selected to be the bracket pulse having the lesser amplitude when both bracket pulses exhibit clean I/Q values; and said reference pulse is selected to be the bracket pulse having the lesser amplitude when I/Q information is unavailable.

27. The method of claim 26 wherein said reference pulse is determined to have an amplitude that is the average of said two matched bracket pulses if said amplitudes are within a predetermined amount of each other.

28. The method of claim 1 wherein said reply code comprises a four digit octal code of altitude information transmitted by an aircraft in response to an interrogation.

29. The method of claim 1 wherein I and Q signals are used to determine bearing of an aircraft that transmitted the reply signal.

30. The method of claim 29 wherein signals received by a directional antenna disposed on top of the aircraft are used to provide bearing information, and signals received by a non-directional antenna disposed on the bottom of the aircraft do not provide bearing information.

31. Apparatus for detecting and decoding reply signals of the type having a plurality of associated time discrete pulses including two bracket pulses and a number of related data pulses that may have been transmitted at discrete data time intervals between the bracket pulses such that the signal content detected during the data time intervals corresponds to the reply signal data code, comprising receiver means for receiving the reply signals and producing in-phase (I), quadrature (Q) phase and video (V) signals for each received pulse; means for detecting received pulses and storing said I/Q/V signals in a first memory; means for storing in a second memory pointer values that correspond to the temporal location of pulse I/Q/V signals in said first memory; means for identifying, based on time of arrival (TOA) values, pairs of potential bracket pulses wherein each pair marks the beginning and end of a reply code; and processor means for 1) determining an angle of arrival (AOA) value for each detected pulse based on each pulse's I and Q signals, 2) selecting a reference pulse for each said potential bracket pair based on relative amplitudes of said bracket pair, and 3) identifying data pulses, associated with said reply signal and detected between occurrence of said bracket pulses, based on said reference pulse to provide the reply code.

32. The apparatus of claim 31 further comprising means for flagging each detected pulse with a confidence factor that indicates whether the pulse is clean or garbled.

33. The apparatus of claim 32 wherein said confidence factor for each data pulse is based on its AOA and amplitude values relative to said reference pulse.

34. The apparatus of claim 32 wherein said confidence factor for each bracket pulse is based on a determination of the quality of its corresponding I and Q signals, relative amplitude and AOA.

35. The apparatus of claim 34 wherein said processor means rejects a bracket pair if both have garbled I and Q signals.

36. The apparatus of claim 35 wherein a potential bracket pair is validated if a data pulse is cleanly matched therewith.

37. The apparatus of claim 36 wherein a pulse flagged as garbled remains in circulation to determine if it can be cleanly matched to a bracket pair.

38. The apparatus of claim 37 wherein a garbled pulse can be shared among a number of reply signals until cleanly claimed by one reply signal.

39. The apparatus of claim 38 wherein said processing means produces a reply code comprising data values that correspond to the signal content in each of said data time intervals, and each data value is assigned a high confidence or low confidence garble bit that corresponds to the confidence that the data value is correct.

40. The apparatus of claim 39 wherein said processing means: 1) assigns a high confidence bit to a data value based on a data pulse cleanly matched to a reference pulse detected during the corresponding data time interval, 2) assigns a low confidence bit to a data value based on a data pulse not cleanly matched to a reference pulse, 3) assigns a high confidence bit to a data value based on absence of an associated pulse detected during the corresponding time interval, and 4) assigns a low confidence bit to a data value based on a time interval with no associated data pulse but for which a shared data pulse was claimed by another reply signal.

41. The apparatus according to claim 40 wherein said processing means comprises means for tracking all pulses including garbled pulses shared by a number of replies, said tracking means also tracking each reply signal for which pulses are associated therewith.

42. The apparatus of claim 41 wherein said reply signals are transmitted by aircraft in response to interrogations, and comprise altitude encoded signals compatible with those of secondary surveillance radar (SSR).

43. The apparatus of claim 31 wherein said processor means accesses pulse data samples from said first memory based on a delay relative to a reference time.

44. The apparatus of claim 43 wherein said reference time corresponds to a detection of a threshold level on the leading edge of a pulse.

45. The apparatus of claim 44 wherein said delay is effected by adding a selected number of pulse data sample addresses to a pointer value stored in said second memory.

46. A method for detecting and identifying a transponder reply signal of the type having a plurality of associated time discrete pulses including two bracket pulses and a number of related data pulses that may have been transmitted at discrete data time intervals between the bracket pulses such that the signal content detected during the data time intervals corresponds to the reply signal data code, comprising the steps of:
   a. producing a video signal for each received reply signal;
   b. detecting potential bracket and data pulses based on said video signals and storing signals corresponding to said pulses in a memory;
   c. pairing potential bracket pulses that mark the beginning and end of a reply signal code based on time of arrival (TOA) of said detected pulses and identifying a reply signal reference pulse for each potential pair; and
   d. matching data pulses to said reply signal reference pulses based on relative TOA and amplitude; said matching process being performed by analyzing all pulses received during a selectable time period and tracking each data pulse for each reference pulse it is matched with so that garbled pulses can be shared by more than one reply signal reference pulse.

47. The method of claim 46 wherein said tracking process includes deleting data pulses previously shared by other reference pulses when a data pulse is cleanly matched to a reference pulse, and further wherein a potential bracket pulse can be shared by more than one other potential bracket pulse.

48. The method of claim 47 wherein said tracking process includes removing a data pulse from circulation after it has been cleanly matched to a reference pulse.

49. The method of claim 48 wherein a potential bracket pair cannot be deleted after a data pulse has been cleanly matched therewith.

50. The method of claim 49 wherein a potential bracket pair can be deleted prior to a data pulse being cleanly matched therewith if a bracket pulse is cleanly claimed by a different bracket pulse.

51. The method of claim 50 further comprising the steps of assigning data values to each of the data time intervals based on the presence or absence of a pulse during each such interval, and assigning a confidence factor to each data value such that a confidence factor assigned to a data value corresponding to the absence of a pulse is based on whether a pulse was initially matched to the time interval but thereafter cleanly claimed by another reply signal.

52. The method of claim 51 further comprising the step of using angle of arrival (AOA) information for matching data pulses to reference pulses.

* * * * *